United States Patent [19]
Thorsen

[11] Patent Number: 5,905,984
[45] Date of Patent: May 18, 1999

[54] COMPUTER-IMPLEMENTED CONTROL OF ACCESS TO ATOMIC DATA ITEMS

[76] Inventor: Hans Verner Thorsen, Korsfararvägen 18, S-181 40, Lidingö, Sweden

[21] Appl. No.: 08/702,468

[22] PCT Filed: Nov. 6, 1995

[86] PCT No.: PCT/SE95/01315

§ 371 Date: Sep. 25, 1996

§ 102(e) Date: Sep. 25, 1996

[87] PCT Pub. No.: WO96/23267

PCT Pub. Date: Aug. 1, 1996

[30] Foreign Application Priority Data

Jan. 26, 1995 [SE] Sweden ................................. 9500277

[51] Int. Cl.⁶ ..................... G06F 15/173; G06F 13/362
[52] U.S. Cl. ................................. 707/9; 707/2; 707/10; 395/200.31; 395/200.46
[58] Field of Search ............... 707/9, 2, 10; 395/200.31, 395/200.46

[56] References Cited

U.S. PATENT DOCUMENTS

| | | | |
|---|---|---|---|
| 5,051,987 | 9/1991 | Conlon ..................................... | 370/255 |
| 5,159,669 | 10/1992 | Trigg et al. ............................... | 395/159 |
| 5,175,848 | 12/1992 | Dysart et al. ............................ | 395/600 |
| 5,253,362 | 10/1993 | Nolan et al. ............................. | 395/600 |
| 5,257,365 | 10/1993 | Powers et al. ........................... | 395/600 |
| 5,263,167 | 11/1993 | Conner, Jr. et al. ..................... | 395/700 |
| 5,265,244 | 11/1993 | Ghosh et al. ............................ | 395/600 |
| 5,276,872 | 1/1994 | Lomet et al. ............................ | 395/600 |
| 5,295,262 | 3/1994 | Seigh, II ..................................... | 707/8 |
| 5,317,566 | 5/1994 | Joshi ........................................ | 370/238 |
| 5,317,729 | 5/1994 | Mukherjee et al. .................... | 395/600 |
| 5,479,395 | 12/1995 | Goodman et al. ........................ | 370/16 |
| 5,488,717 | 1/1996 | Gibson et al. .............................. | 707/2 |
| 5,630,059 | 5/1997 | Brady et al. ....................... | 395/200.47 |

FOREIGN PATENT DOCUMENTS

0583108 A2  2/1994  European Pat. Off. .

*Primary Examiner*—Paul V. Kulik
*Assistant Examiner*—Jean R. Homere
*Attorney, Agent, or Firm*—Burns, Doane, Swecker & Mathis, L.L.P.

[57] ABSTRACT

A method and a system for accessing data in a computer-based data processing system is described. The method comprises the steps of initiating and maintaining data access nodes in a variable access structure. Each access node is provided with references to other access nodes and/or to data items representing an object, each data item carrying only the amount of information which is relevant for its purpose. The data items or the references are provided with a time parameter thus enabling version control and the possibility to handle static or slowly changing data and frequently changed and updated data in a corresponding manner. The access nodes comprise access control parameters for access control from a safety point of view as well as for enabling different views of the access structure and underlying data and objects.

82 Claims, 8 Drawing Sheets

COMPUTER-IMPLEMENTED CONTROL OF ACCESS TO ATOMIC DATA ITEMS

FIELD OF THE INVENTION

The present invention relates to methods and systems for accessing data and for maintaining access structures in a computer-based data processing system.

BACKGROUND OF THE INVENTION

In most computer applications there is a need to manage and access data describing or representing properties or conditions of a real or an imaginary object. A database system, which essentially is a computerized record-keeping system, is an example in which objects or occurences are described by means of items of information stored in the database. An object could e.g. be a person or an enterprise with a number of characteristics, and typically there is a number of different parties interested in different aspects of that object. Similar examples are databases within corporate networks, wherein different departments are interested in different aspects of the activity, such as finance, production, sales and storage.

In the case of a person being described, the interested parties may e.g. be a hospital, a bank and the tax authorities, each having a separate database specialized for their specific needs. Now, the person may be described by such characteristics as name, identification number, blood group, income and debts. Some of these particulars are static, e.g. blood group, and others are variable, e.g. income and debts. In this example the hospital would be primarily interested in recording name, identification number and blood group, while the bank would record name, identification number, income and debts and the tax authorities would record name, identification number and income.

It is clear that there is an overlap between the different databases, and it is typically uncertain who is the one responsible for the maintainance of each item of information, with a great risk of inconsistency as a disadvantegeous consequence. Sometimes the parties need to communicate information between their databases, whereby data may be exchanged via e.g. file systems, which requires a common standard regarding operating systems and communications means, something which is not so easily achieved. In general, each database is individually designed according to the owner's needs and view of the object and has a unique set of associations within the database. In state of the art databases, e.g. SQL interpreting relational databases, a database model has to be choosen and fixed, and is thereafter in practice statically storing associations and data items in a user specific way. Recent development in the usage of multimedia, where a number of different data presentation techniques are used simultaneously, for example sound, images and movement of a simulation device, has shown that state of the art access control is inadequate for this mixture of information.

In this text the term database is used in a broad sense, referring to any computer-based system in which data items or signals are occurring, stored and processed in some way. Firstly, there is the common database concept in the above example, and secondly, any data processing system which handles previously stored data and newly recorded data, such as signals read out or sampled from an apparatus, constitutes a kind of database. An example of the latter is the case in which a periferal device, e.g. a printer, is coupled to a computer network. In order to utilize the printer it is necessary to combine data describing the printer parameters with information about the current condition of the printer. In state of the art data processing systems and methods there is no natural way to handle information of different nature, such as parameters and time dependent signals, in a conform manner.

There are some previously known methods for handling certain time dependent data in a database, for example a method for the storage of multi-versioned data with retrieval based on searched query, which is disclosed in the U.S. Pat. No. 5,317,729. This method is, however, directed to version control of engineering changes to a product design in a database allowing multiple users to work on the same object. Different data versions are kept track of i.a. by means of change notices and by storing affected data items in certain files. This method allows storage and retrieval of time-oriented and view-oriented versions of engineering change information in which the engineering change information progresses through a set of status conditions, and access to the data by different user groups is conditioned upon the status of the information. When an attribute to an object stored in a relational database is changed, a new version of that object is created. A logical key value is used to identifie data items considered to be different instances of attributes to the same object. The access level for information associated to an object is based on security aspects for a product project and can be set by adding to the object an attribute depending on the required security level. Different user groups can then have access to different views of the stored information. It is in this method also possible to retrieve information from different given versions of an object. A further object of this known method is to provide improved processing efficiency of versioned data stored in a relational data base table.

The U.S. Pat. No. 5,253,362 describes a method for storing, retrieving and indicating a plurality of annotations in a data cell. This method also employs a kind of version control in comparing previously stored data with new input data, and in recording a time and user indication for each data input. This method is, however, primarily directed to distribution of data to different locations, which is suggested to be used in record keeping system where one piece of information is entered into multiple records.

A data access structure for facilitating processing of statistical inquires on stored data is disclosed in the U.S. Pat No. 5,265,244 and the corresponding EP-A-0 235 535 document. This structure includes a plurality of data nodes storing whole records of data, and a plurality of access nodes, each storing at least one pointer to another access node or to a data node, and organized so that each access node is linked directly or indirectly to at least one data node. Statistical information is associated with a subset of the plurality of access nodes and data nodes concerning the records stored in the data node or data nodes linked directly or indirectly to the respective access node and/or data node.

A disadvantage with prior art access and version handling methods is that data to a large extent is fixed in predefined association structures requiring dedicated application programs to retrieve data, and there is a commercial demand for an access method that overcomes these and other problems.

EP-A-0 229 232 discloses a file manager system having access nodes where each access node maintains lists of attributes for characterizing the respective nodes.

EP-A-0 398 645 discloses a system for controlling access to objects in an object oriented database by means of an access control list. Permission for different operations on the objects of the database are assigned to different users and listed in the access control list.

OBJECTS OF THE INVENTION

It is an object of the present invention to provide a method and a system for controlling access to and associating data in an application independent fashion, which enables data of different nature to be handled in a conform way. Another object of this invention is to provide a method and a system that enables avoidance of multiple databases describing one and the same object. A further object is to provide an access structure for controlling access to data and for allowing different views of stored data objects depending on different aspects of the stored objects or different access rights of a user. A still further object is to cater for fast access to shared data by a several simultaneously active user applications and to achieve access to data stored in different databases or data storage structures.

It is also an object of this invention to provide a method and a system for the above purposes that:

ensures a high degree of readability of results and system parameters for a human observer, allows portability between different computer hardware, operating systems and networks, requires a small amount of hardware and software resources recognizing the well known fact that small scale systems are safer and easier to handle than large, enables a high degree of traceability of all important events resulting from carrying out the method, whereby safety, efficient maintainance and error handling is ensured, and that provides a high degree of modularity in the different steps of the method and components of the system, whereby different combinations are applied to complex applications.

These and other objects and advantages are accomplished by the present invention by means of a method and a system of the above mentioned kind, which present the features of the appended independent claims 1, 14 and 17. Further features and embodiments of the inventive concept are indicated in the dependent claims.

SUMMARY OF THE INVENTION

In accordance with one aspect of the invention, data is structured into separate and unassociated atomic data items, each data item carrying only the amount of information which is relevant for its purpose, or is kept in an existing data structure such as a database table or the like. In such existing data structures, attributes of an object is typically stored as separate but closely related data items. A data access node is created for each data item or for a group of data items, in which access node a reference to said data item or group of data items is stored. Each access node is incorporated in a variable data access structure, wherein a first access node is linked to a second access node and whereby the nodes preferably are linked independently of whether the data items referred to in the nodes are related to the same object or not. A reference stored in an access node may also point at or refer to a computer program, or a control signal terminal or a status signal terminal of an apparatus and such instances are in this text comprised in the term data item. The access structure may comprise access nodes storing a reference list of one or more referenceses to other access nodes as well as to data items, so that each access node is directly or indirectly linked to each data item. In this manner, access to data items and objects is controlled through the access structure independently of the data input or output method, data storage format or data storage relations. Thereby, data items being sampled, stored or assorted in different arrangements or databases, making up a composite database, can be associated and retrieved by a user without knowledge about the storage and association method used in the respective data storing structure. Different views of a database or a subset of a database is obtainable by rearranging the access structure itself or by retrieving and storing references pointing at data items of a selectable aspect, kind or class.

Each access node in the inventive access structure is provided with an access control means, by means of which the access of a user to the content of an access node and thereby to data items or to other access nodes is controlled. In accordance with the invention, such an access control means has the function of an access filter or a data shell that protects the content of the node. From a user applications point of view, an access node or the access structure is an interface between the environment and an object, a data item or a control means of an apparatus. The access control means may be used for controlling acccess from data security point of view, and is then designed to be responsive to certain parameters such as access keys, user identity, application group etc, as well as for obtaining different views of the database. Contrary to prior art, data items or objects accessed through the inventive access structure are preferrably associated upon retrieving or when composing a selected view. By means of the access control means and a control structure comprising an application dependent specification and an access specification, communication with access nodes is performed and associations are established by traversing the access structure according to presettable rules.

In a preferred embodiment of the invention, each data item or reference to the data item is provided with a time parameter indicating the time at which the data item is read, stored sampled or any other selectable time. Variable data is updated by replacing an old data value with a new one or, preferrably, by creating a new data item in which the last data version is stored and by adding the new data item to a relevant group of data items, whereby data items may be added at any rate enabled by the current data processing system. Updating and adding rate often depends on the type of data, for example inventory lists are changed in an uneven, relatively slow pace, while stock rates may be changed more often and a sampled signal is updated at a high frequency. In accordance with the invention, such different kinds of data items as in the previous example are treated in the same way by providing a time parameter to each data item and by storing them in a common format, for example the string format.

According to one embodiment, data retrieval or view establishing is carried out by specifying a time value or a time interval for the data to be retrieved or associated, by storing in a result file a data item or a reference to a data item having a time parameter whith the specified time value, or storing in a result file data items or references to data items having time parameters with time values in the specified interval, and then communicating the result file containing said data item or data items to the retrieving or associating user application. In another embodiment of the inventive concept, association is made by compiling user specific data item information, which describes the data items to which a user has an access right. For each data item, location and access information is compiled, which describes the loation in the storage structure of the data item and the access parameters and references of the access structure that are necessary to retrieve it. Upon retrieving or possibly in advance, data items to be associated are selected. Then, by means of said data item information and said location and access information, the selected data items are associated and retrieved.

Retrieval of information is normally executed in the form of an application procedure calling an access node, whereby an application has a preselectable access right level to certain access nodes or data items. A search specification for traversing or searching the access structure comprises the identities of a sought after object and the application. Contact with a first access node is established and if the access node contains a reference to the sought after data item, further access to the data item is controlled by means of the access control means of that access node. If, on the other hand, the contacted access node does not contain a reference to the sought after data item, the search proceeds dependending on a reference from the first access node to a second access node. The search may proceed via further references until the relevant information is found. In order to ensure an efficient search in the data access structure, which may be distributed geographically on different interconnected computer units, the invention also provides a navigating means which navigates among the linked access nodes in accordance with certain navigating rules.

According to a preferred embodiment of the invention, each access node is realized by means of an active process also comprising the access control means. Access to and communication with access nodes is controlled by each process, which protects and maintains the references to the data items and to other nodes of the access structure. When initiating the access structure each access node process is brought into a waiting condition, wherein the access node process is waiting for a user call. If a user application calls the access node, then, by means of said node process, a subprocess, which preferably is a copy of the parent process, is started for controlling access operations on the reference (s) and/or the data item(s) of an access node and a timer is set. The timer is controlling the time during which said subprocess is allowed to exist. The main access node process is again brought into a waiting condition, waiting for further user calls. In this manner, viz. by starting serving subprocesses upon each call access can be provided for an abritrarily large number of simultaneously active user applications.

In accordance with one aspect of the inventive concept, access control may comprise the following steps. Upon a user call, it is by means of the subprocess checked that the identity and/or the address of the user application or user computer unit is listed in a control file, and if said identity is not listed, then the subprocess is terminated and access is thereby stopped. If the user computer unit is listed, then it is checked that the identity of the user is listed in an access rights catalogue. In one embodiment a personal identity code may be checked and/or an access key may be polled. If the user and/or his personal identity code and/or his access key is/are listed, then the user is allowed or enabled to communicate with the access node subprocess. Access to and communication of data related to objects, such as data and references, interfaced by or encapsulated in the access node is thus controlled by the access control means allowing or enabling different users to have different views of the access node itself and the rest of the access structure and the underlying data items. According to another aspect, the access control means may be deviced to control access rights more closely connected to the data object, and it is then checked whether or not a user has an access right to an object referred to by an access node rather than an access right to the node itself. If an access right exists, a copy of the object or a reference to it may be communicated to the user.

When the inventive access structure is used to interface an apparatus, a reference to a data item is stored in an access node and an output signal from said apparatus is detected and temporarily stored in said data item, whereby said output signal is made available through said access node, which thereby is adapted to represent the condition of said apparatus. In other embodiments, the reference a points directly at the adress of an output terminal of the apparatus or to an input terminal of a computer based data processing system, at which terminal an output signal from the apparatus is available. In a further embodiment of the invention, an apparatus is controlled by creating an apparatus control data item or an apparatus control program, by storing a reference to it in an access node and by transferring the contents of the control data item or an output control item of said apparatus control program to an input terminal of said apparatus.

In order to ensure a high degree of portability and readability, data, control files and communication protocols used in the inventive method and arrangement are represented in a common, general data format, preferably in the general string format.

A system and an apparatus for accessing data and controlling access to data according to the inventive method comprises means for performing the steps and the functions of the method. All means may be realized as hardware units and most of them are advantageously implemented as computer programs, executing on hardware parts of the arrangement. In particular, a computer program product, for use with a data processing and storage system, for carrying out an embodiment the inventive access method and realizing an embodiment of the inventive access structure comprises a recording medium and means for performing said method and realizing said access structure recorded on the storage medium.

DESCRIPTION OF EMBODIMENTS

1. Data Processing System

Figure 1:
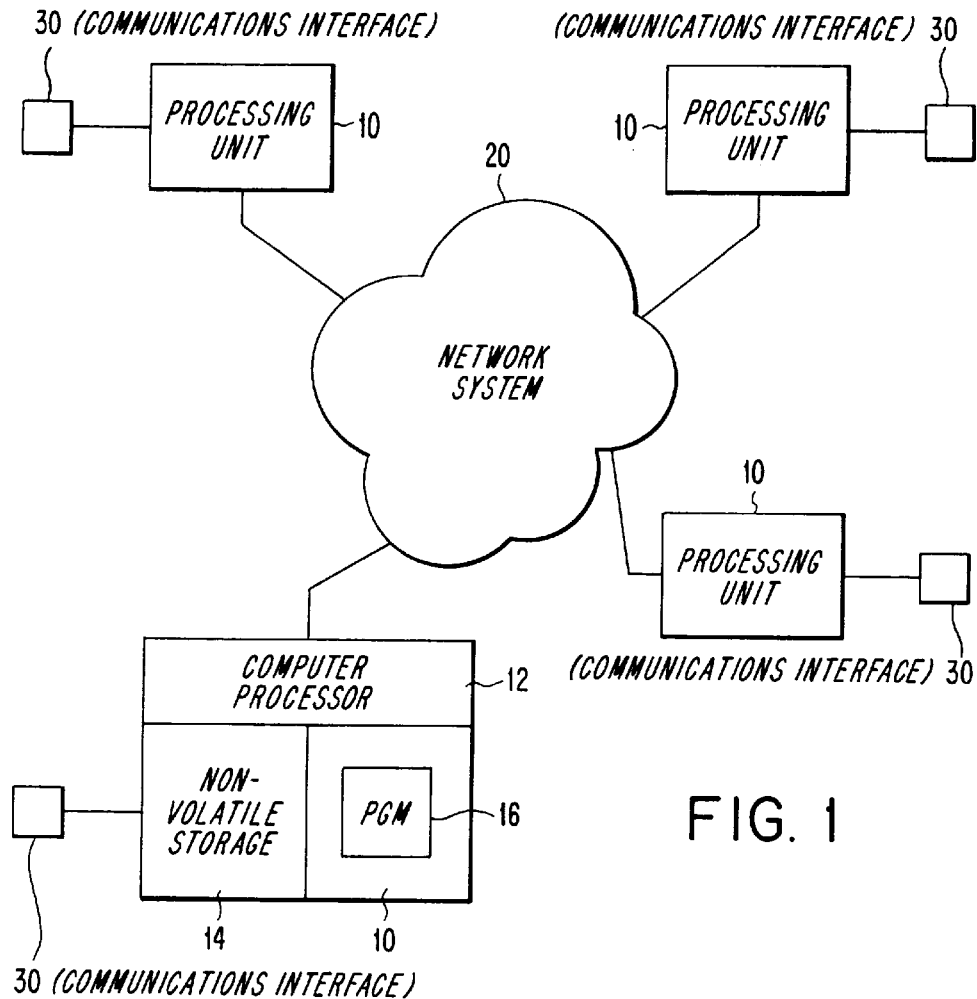
FIG. 1 shows schematically components comprised in a data processing system for the implementation of this invention.

FIG. 1 shows schematically components comprised in an embodiment of an apparatus or a data processing system for performing the method according to the invention. As shown in this figure, a data processing system comprises a number of real or virtual processing units 10, linked by means of a network system 20. Each processing unit 10 comprises a computer processor 12 or a time shared part of such a processor, a non-volatile storage device 14 and at least one component of a data control program 16 which operates on the computer processor 12. A human user or an apparatus may interact with the data control program 16 through a communications interface 30, which for example may be a standard input and/or output device such as a keyboard, a data screen, an A/D converter or the like. Application data or control data may be transferred to a first processing unit 10 either via a related communications interface 30 or a second processing unit 10 connected to the network. The, in this text, described steps and mechanisms of the invention are performed by means of this kind of data processing system, either as especially designed hardware units or in the shape of a computer program executing on a general purpose computer or data processing system.

2. Structuring Data

There are some different cases in the structuring of access to data according to the present invention, which cases are handled in different embodiments. For example, new data may be stored in any convenient manner and references or pointers to data items or groups of data items are then established in the inventive data access structure and thus creating a new database. In particular, the inventive access method allows data to be stored in simple storage structures that requires short access times since association is made dynamically on the access structure level. Already stored and associated data may be imported from an existing state of the art database structure to a more loosely associated data structure coupled to the access structure. However, in many cases it is convenient to keep the data stored in the original database structure but establishing new references from access nodes in an inventive access structure to the data items in the existing database. This is particularly true during transition from state of the art database management to access structures in accordance with the present invention.

In the case of new data, the data describing an object is divided into distinctive and unassociated pieces of data, each carrying information about a certain aspect of the object. Each piece of data is stored in an atomic data item, whereby the information content of the item is limited to the smallest possible amount of information which is relevant for its purpose. For example, if the object is a person and the persons name, identification number and phone number are to be stored, these three pieces of information are clearly separated and each stored in one data item. Each of these three information atoms or data items are themselves composed of a number of characters such as letters or digits, as the case may be. However, for this purpose only the whole series of characters are relevant and therefore fulfill the atomaicity requirement of the inventive method.

In the case of importing existing data from a database of a known kind, the above mentioned three pieces of information would typically be clustered and associated in a more or less fixed data structure, e.g. a table or a record. According to one embodiment of the invention these clusters of information are broken and the information is separated, as in the first case. A data importation means and a data structuring means, comprised in an embodiment of the inventive system, extract the information from the existing database and splits it into files adapted to storage according to the inventive method. A control file describes the pieces of clustered data which are to be extracted, the format of the input file and the format of an atomic output file. Thus, data is drained off the old database and said old database can be disposed of.

Figure 2:
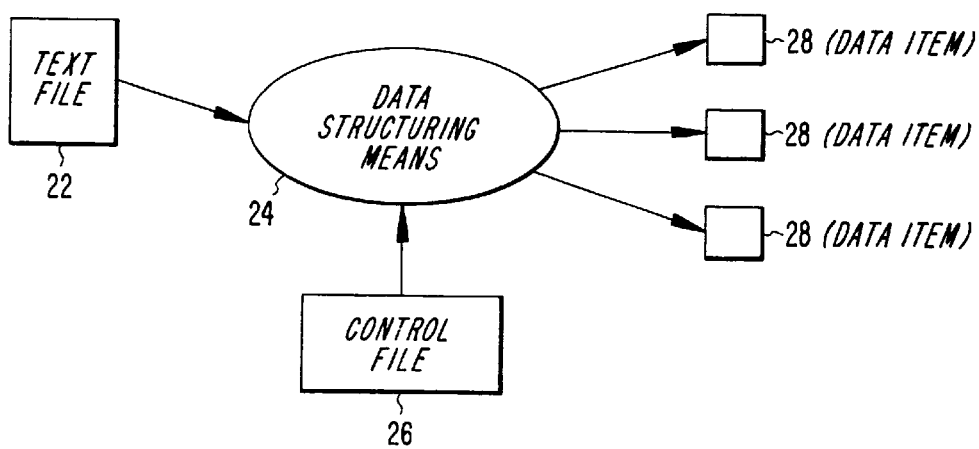
FIG. 2 illustrates the organization and structuring of a collection of data items.

FIG. 2 shows an example of how data may be imported to the inventive storage structure. A collection of data from e.g. a state of the art database is stored in a text file 22. Data is transferred from the text file to a data structuring means 24, which depending on a control file 26 restructures the data and produces a number of atomic data items 28. The control file 26 describes the format of the input file and the data atoms to be produced. In some implementations of the invention, depending on the original data storage, a per se known spreadsheet or the like may be used in a further step of the transformation process.

Figure 3A:
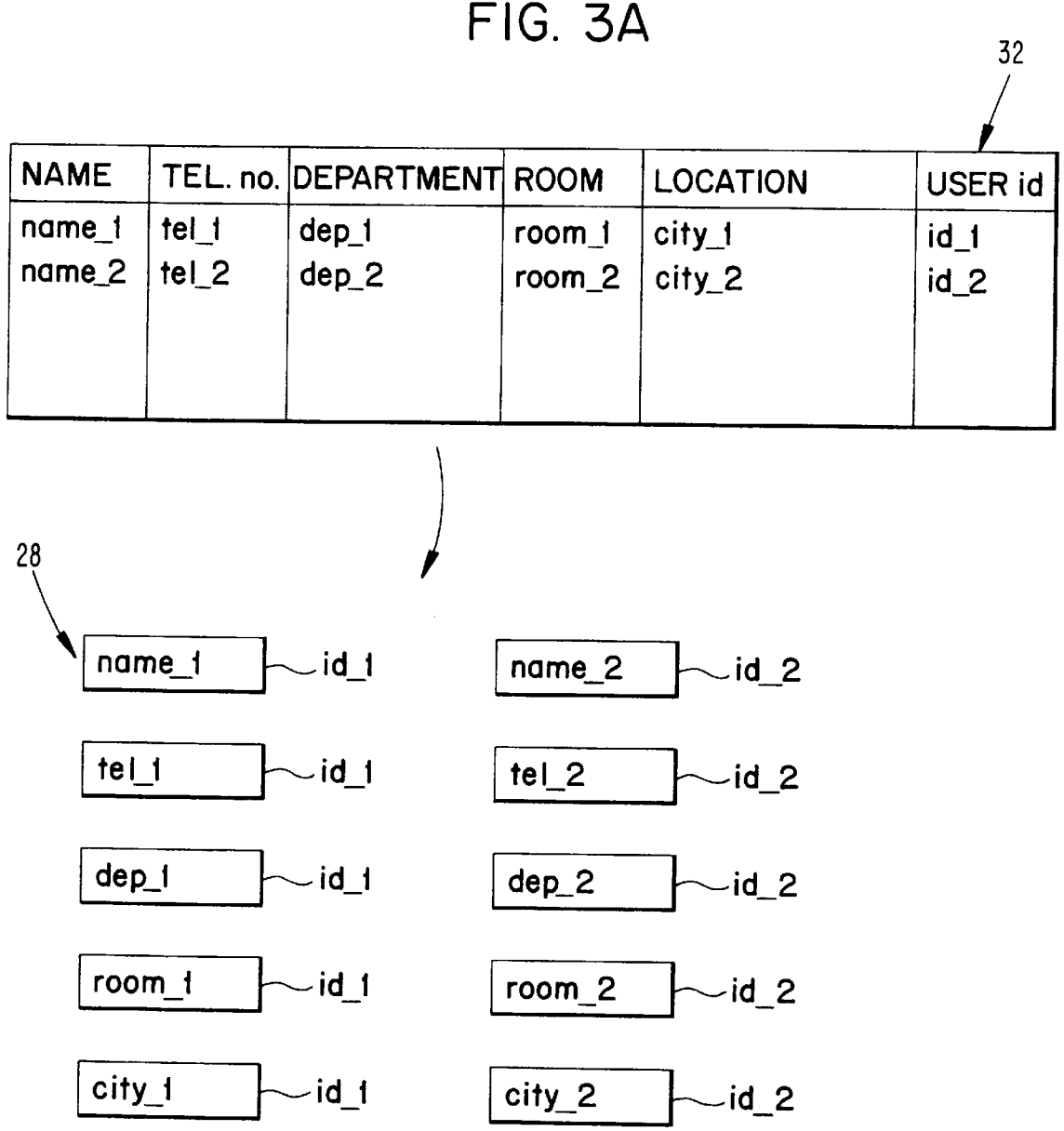
FIG. 3A shows a data table.

The data file 22 may e.g. contain tables 32 of phone book particulars, as shown in FIG. 3A, which are transformed to atomic data items 28. The object identities in this example are users id_1 and id_2, respectively, and each data item 28 describes an aspect of one of the objects. The data is structured into specific data classes, and each classified piece of data is thus stored in an atomic data item. In this particular example, each class represents an aspect of the object and each class contains one data item. Data that varies over time is updated by adding new data items to the relevant class forming a group of data items.

Figure 3B:
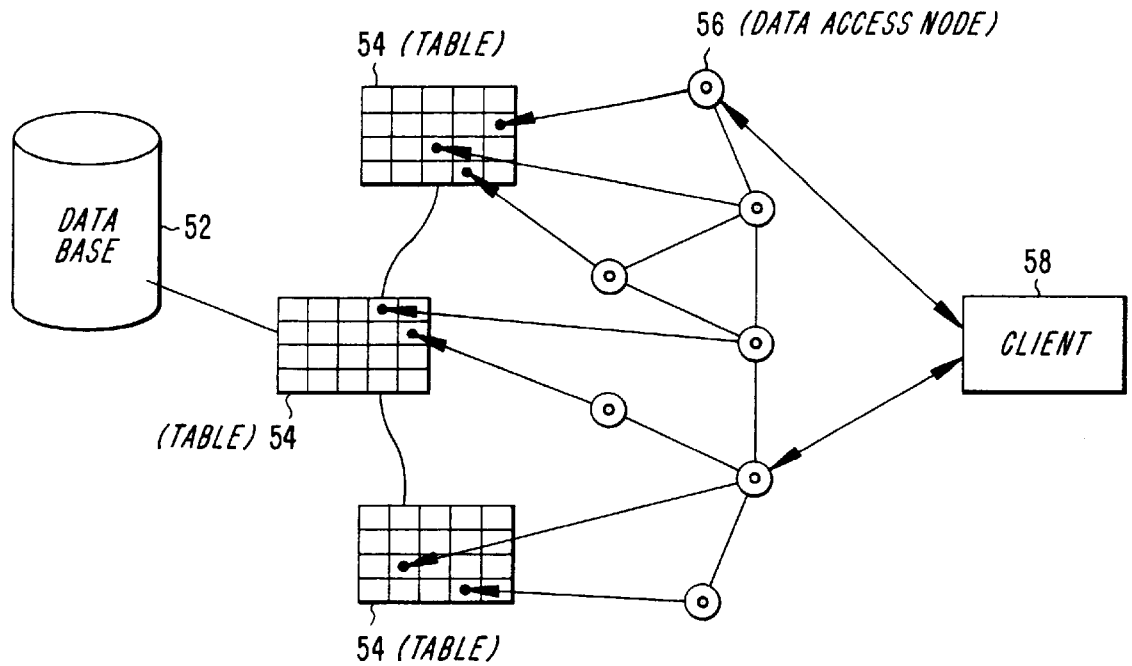
FIG. 3B illustrates an inventive access structure coupled to a state of the art data base.

A third embodiment, where new references to data are established but the data is kept in the old database is especially useful during a transition from a state of the art database to a database according to the invention. This embodiment allows establishing of an inventive access structure for accessing data while maintaining a coexistence of a state of the art database, e.g. an SQL database, and a database managed according to the inventive method. In FIG. 3B is shown a state of the art database 52, storing data in a number of tables 54 and being provided with specific data associations. Depending on a control file, the data associations are rearranged, references or pointers to each of the selected data items of the tables 54 are arranged and stored in a number of data access nodes 56. A client 58, for example an application program, communicates with the access nodes 56 of the access structure according to the inventive method, and thus a new interface is provided between the old database and the user. The same access structure comprising access nodes 56 may simultaneously refer to data in a number of different databases, thereby connecting them and offering a conform access method to all data. In one embodiment an additional interface may be provided between the old database and the inventive access structure, whereby the interface may be arranged as an access node serving the rest of the access nodes or serving a certain application. In such a case, an access node may be communicatably connected to a dedicated database interface means, e.g. an SQL query processor, for accessing data in a database, with a common communications protocol for communication between access nodes and the database interface means and a database specific communications protocol for communication between the database interface means and the database management system.

3. Data Access Structure

As has been mentioned, a reference to an atomic data item or a group of data items is stored in a data access node, which itself is arranged in a variable data access structure, preferably in the general form of a graph. The access node in the graph preferably comprises a catalogue with a list of references or pointers to other access nodes in the graph or directly to a data item or group of data items. Generally the content of the catalogue is independent of the data which is referred to in the access node, but each access node is directly or indirectly linked to each data item. One advantage of separating the reference listing from the association of data is that the access nodes and the listing may easily and arbitrarily be rearranged. The access nodes may be arranged in any configuration, e.g. a tree, a list, a star or any other graph, and is preferably arranged in some kind of hierarchy.

Figure 4:
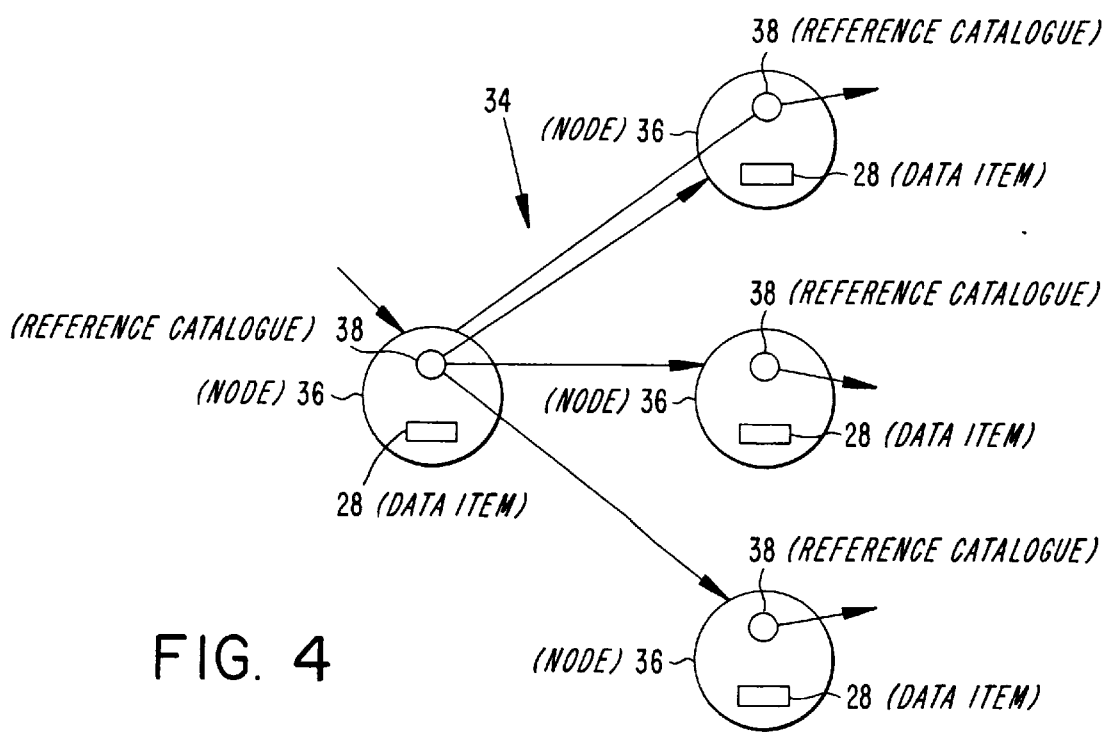
FIG. 4 illustrates a storage structure in the form of a graph.

References to data items are thus stored in access nodes in an access structure configured in a general graph. An access nodes may be designated to refer to a certain kind of data. FIG. 4 shows a part of such a graph 34, comprising a number of nodes 36. Each node in this example comprises at least one reference to a data item 28 and a node reference catalogue 38 which contains a list of references to other access nodes of the graph 34. As has been mentioned there may also be access nodes referring only to other access nodes. From a user's or user application's point of view a data item 28 can in an abstract sense be said to be stored in an access node. The reference catalogues 38 are used to maintain the access structure and to facilitate search navigation in the access structure.

In one embodiment of the invention, an access node is arranged as an interface to an apparatus, whereby a data item or a pointer in said access node refers either directly or indirectly to signal terminals of said apparatus. In general, an access node may thus be used as an interface to data pertaining to any real object. In this text we sometimes, figuratively speaking, refer to this as storing an object in an access node.

In a preferred embodiment of the invention, each access nodel is realized as an active process, which may be executed by a multiple of processors (CPU) or by means of one processor and a time sharing system. The control of access to data and to other access nodes is thus managed by the process, which also handles the reference catalogue comprised in said access node. Access nodes may also be implemented in other ways, for example by a common file or any other data structure, but the realization of access nodes by means of processes has shown to be particularly convenient and powerful in order to achieve a dynamic access structure.

The initiation of an access structure in accordance with the invention is carried out by suitable means and comprise the steps of:

initiating an instance of an access node data structure, which in preferred embodiments includes starting a process, by means of an access node initiating means;

assigning each access node a node description and an identity code;

establishing references to other access nodes according to a presettable initial configuration, e.g. a hierarchical configuration;

possibly, establishing a reference to a data item or to a group of data items for example in a table;

establishing access parameters, for each access node, for controlling access to references and possible further information which is accessed via an access node.

The initial access parameters may be deviced to allow a certain view of the initial access structure, for example a fully transparent view, a view completely blocked to other users than a supermanager or any other suitable combination. The initiation may also include establishing communications protocols for communication with and between access nodes.

In one embodiment the means for realizing the inventive data access structure are implemented in the high level programming language C and utilizes system calls to the operating system according to a standard called POSIX 1003.1, whereby the nodes of the access structure uses the protocol TCP/IP to communicate with other nodes or with the environment to the access structure. Certain nodes may be arranged to communicate with data storage structures or devices by means of particularly dedicated protocols. Any other implementation language and communication protocol may of course be used to realize the inventive method.

Figure 5:
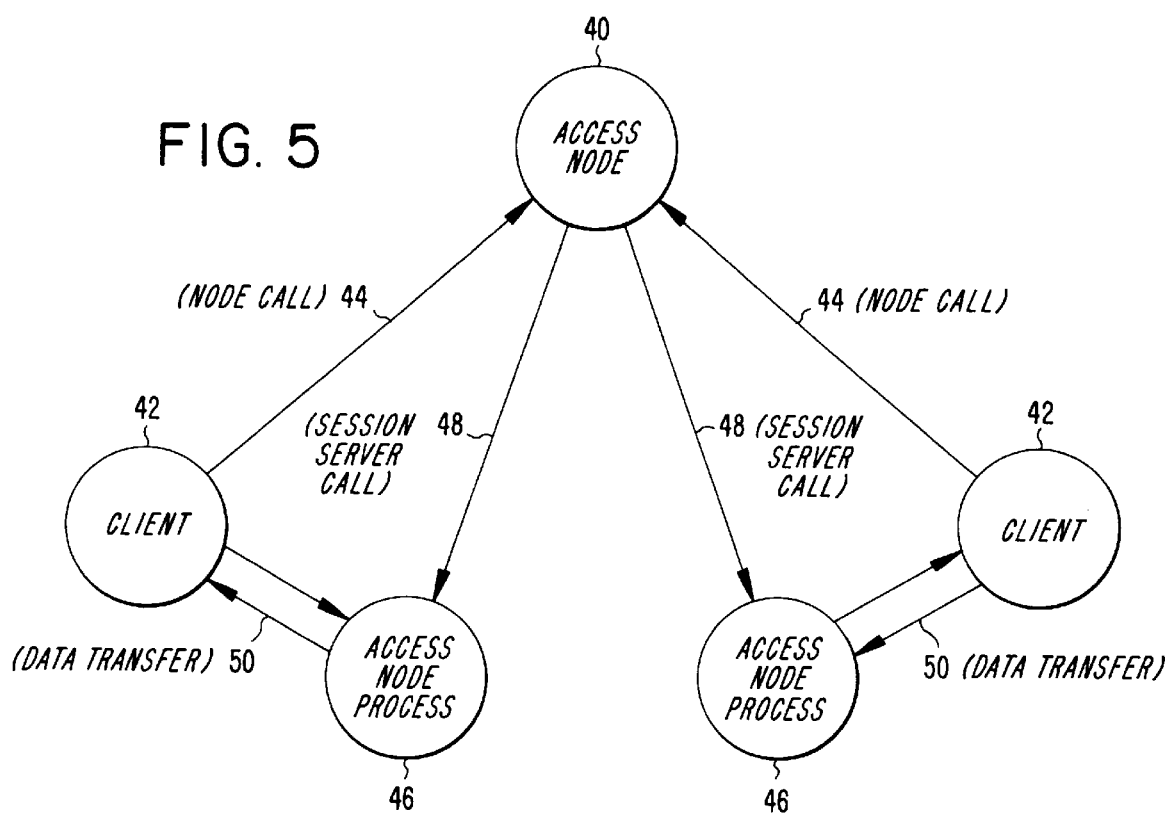
FIG. 5 illustrates a process hierarchy.

Using a client-server architecture abstraction, each access structure user or client in preferred embodiments executes in a separate process during a session. FIG. 5 shows a process hierarchy, in which a first access node 40 is connecting to two clients 42 via access node calls 44. Upon a call, the first access node process 40 initiates a second access node process 46, which is a copy of the parent node, i.e. the first access node 40 with all qualities and access parameters alike. The first access node 40 acts as a node server for second access node processes 46, and may serve a large number of such second access nodes 46. The first access node 40 delegates the communication and access control to said second access node processes 46 then acting as session servers, said first access node 40 communicating with said second access nodes 46 by means of session server calls 48. Data is communicated between a session serving second access node 46 and a client or user application 42 through process calls and data transfers 50. By means of this delegation mechanism, an access node controlling access to certain data items or certain views of the data collection may simultaneously serve a large number of users and user applications.

In table I is shown a part of an example of a control file for specific nodes, which describes how these nodes have been listed in the graph. The first fields ".", "..", "finance" and "hospital" are obligatory in this embodiment, and refer to the name and the position in the graph of the current node. The second field is a type indication. The indication "tcp" means that there is a reference to another node and that the reference is implemented in the TCP/IP protocol, whereas the indication "data" means that the node contains a refernence to data. The third field "1.0.0.1", "2.0.0.2" indicates the identity of the computer unit of a network in which the node resides. The fourth field "5124", "5126" etc indicates the process number of the access node, and the fifth field represents the identity of the object to which access is controlled. The sixth field "r-x" indicates access control or access filter parameters which represent the relevant access level for that node. For example, "r" means that reading is allowed and that the TCP/IP address to this node may be obtained.

TABLE I

| [OBJECTS] |
| --- |
| . = tcp,1.0.0.1,5124,12.ab,r-x<br>.. = tcp,1.0.0.1,5126,12.ac,r-x<br>finance = data,1.0.0.1,5128,12.ad,r-x<br>hospital = data,2.0.0.2,3014,12.ae,r-x |

4. Access Control

In order to prevent unauthorized access to data, access rights are checked on several levels in different embodiments. For example, the adress of the user application or client is first checked, and if the adress is known, the access rights of the client is then checked. Every object and reference of an access node has an access list which is polled before a client command is executed. In one embodiment of the invention, a maximum value is set for the time during which a client may communicate with an access node or with a subnode acting as a session server. Unauthorized intruders may thereby be detected on the basis of their communication rate. For example, external intrusions are often carried out through a modem with a slower baud rate than users connected to a local area network and setting a short time sufficient for normal communication will delimit the possibilities of data exchange. A logging system may be comprised, which logs and renders traceability of communication with an access node, reading and writing operations, client commands and accesses as well as the commanding users and/or applications.

In a preferred embodiment of the invention, access control parameters constituting an access filter are comprised in the access nodes. The access filter is arranged to let different interested parties or clients have their specific view of the stored object, objects or references of the access node. This access filter is also used together with a navigator, in order to enhance the navigation efficiency.

Figure 7:
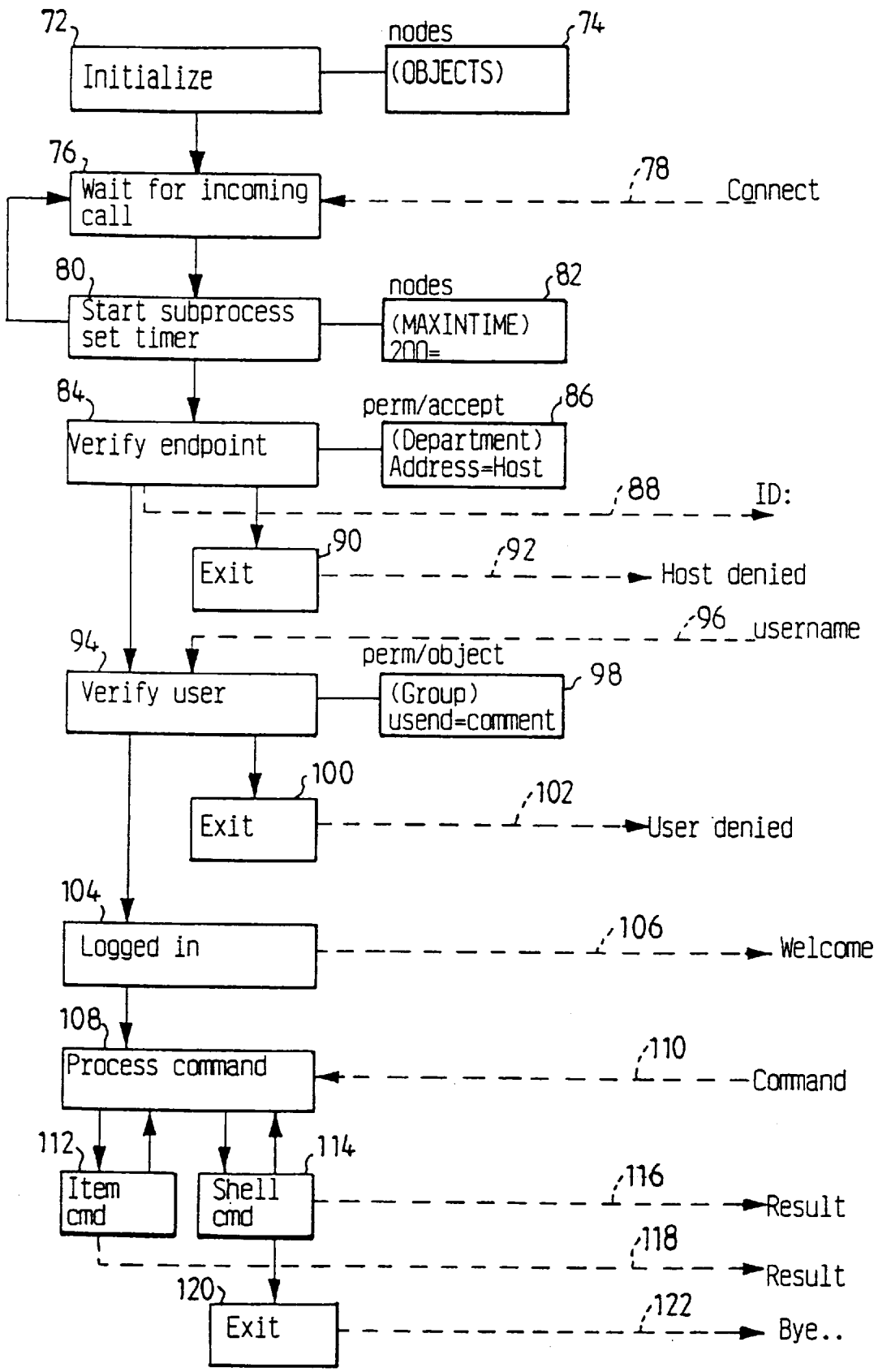
FIG. 7 shows a flowchart for communication with an access nodel and access control of data according to one embodiment.

FIG. 7 shows a flow chart of an embodiment of access control according to the invention, wherein the white boxes represent steps of the method, the filled boxes represent control files and the intermittent lines show the communication with a user. In step 72 an access node process is started and initialized, and access node parameters concerning other nodes and objects referred to by the node are read from a control file 74. In step 76 the access node is kept in a waiting condition, waiting for incoming user calls 78. If a user call is received, the access node process starts a subprocess in step 80 and sets a timer depending on the control file 82 for the period the subprocess is allowed to exist. The purposes of the timer is to protect the access node from intruders having abnormal communication channnels, but it is also used to prevent passive subprocesses from unnecessarily occupying system resources. In step 84, the subprocess verifies the user, depending on a control file 86 containing information about accepted and permitted user identities. The adress and the identity of the user is polled in communication 88. If the user is denied access, the subprocess is terminated in step 100 and a message 102 is sent to the calling user. Thus, both the identity of the user computer and of the user controlling it may be checked. If, on the other hand, the user is permitted and accepted, the user is logged in to the access node in step 104 and 106 and is allowed access to functions of the access node and objects encapsulated in or referred to by the access node. Thereafter, further access to and communication of data and references contained in the access node is controlled by means of an access filter having certain access control parameters and allowing different users different views of the access node, the access structure and the underlying data.

Figure 8:
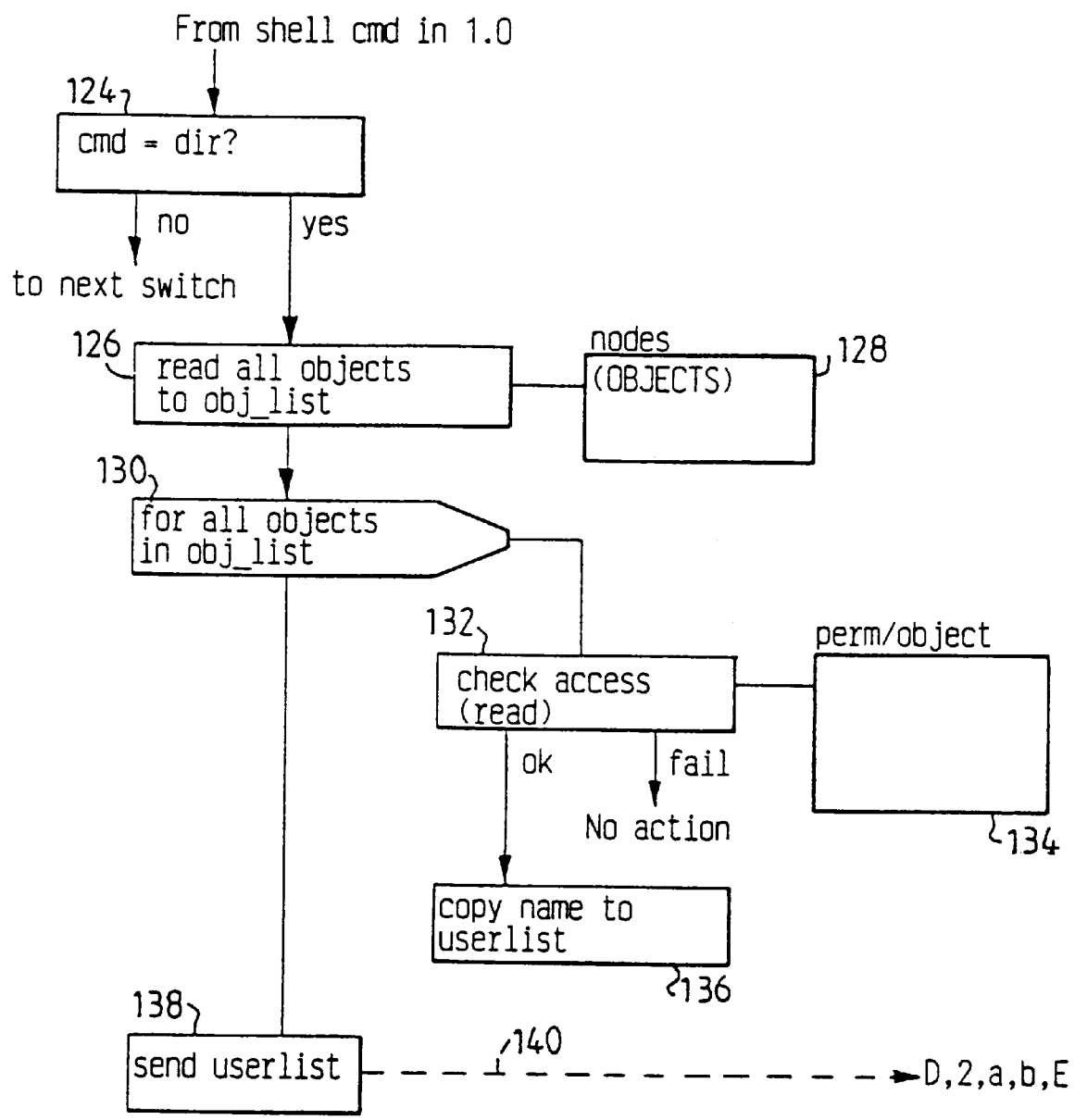
FIG. 8 shows a flowchart for an embodiment of an object protecting means comprised in an embodiment of the access control means.

FIG. 8 shows a flow chart of a method for implementing an object access control means or an object filter comprised in an embodiment of the invention. The object filter is used in conjunction with the previously mentioned access control to protect an object referred to by an access node. In step 124, upon a user command (cmd=dir) all objects are copied to or listed in an object list 128. Thereafter, in step 132 every object in the object list is checked in respect of whether or not the user is permitted access to it. An object access list 134 is thereby used as a check reference. If access right exists for an object, a copy of or a reference to that object is input in a user list, step 136, and is communicated to the user in step 138 by call 140.

A further feature comprised in some embodiments is that an access node comprises one access rights list for every object or type of object referred to by the access node, in order to enable a mechanism allowing certain users to see references to other access nodes and other users to see only the data or object referred to by the access node.

5. Time Parameter

According to preferred embodiments of the inventive method, all data is provided with a time parameter stored in connection to each data item. This allows version handling and more important the management of data of different nature in a conform way. This feature is due to the inventor's recognition of the fact that data in different context mainly differ in the freqeuncy of changes.

For example, static data has a value with a changing frequency of zero changes per time unit, whereas variable data may vary discretely or continuously at any rate. Changes may occur asynchronously at non-anticipatable moments, e.g. stock-exchange rates, or synchronously at predetermined moments, e.g. a video signal sampled with a certain sampling frequency.

In a preferred embodiment, updatings and changes to the database may only be made in chronological order, i.e. old data can never be overwritten by a user. However, a means is provided which allows a database administrator to erase data or selected parts of the data. All data may be read by an authorized user or user application, and it may be specified that the last data or any selected data from a certain point of time or data from a selected period is read.

6. Associating Data and Initiating Views

Association of data is, according to the inventive method, performed dynamically, in the sense that data is associated upon search and retrieving of data, whereby information about the storage of the data is hidden to a user application. As has been mentioned, data is stored in an arbitrary manner and referred to by access nodes arranged in a variable access structure, whereby each node has at least one reference to another node. The references are independent of, or losely coupled to the data stored in the nodes. Thereby, association of data is not fixed in the storage structure.

Figure 6:
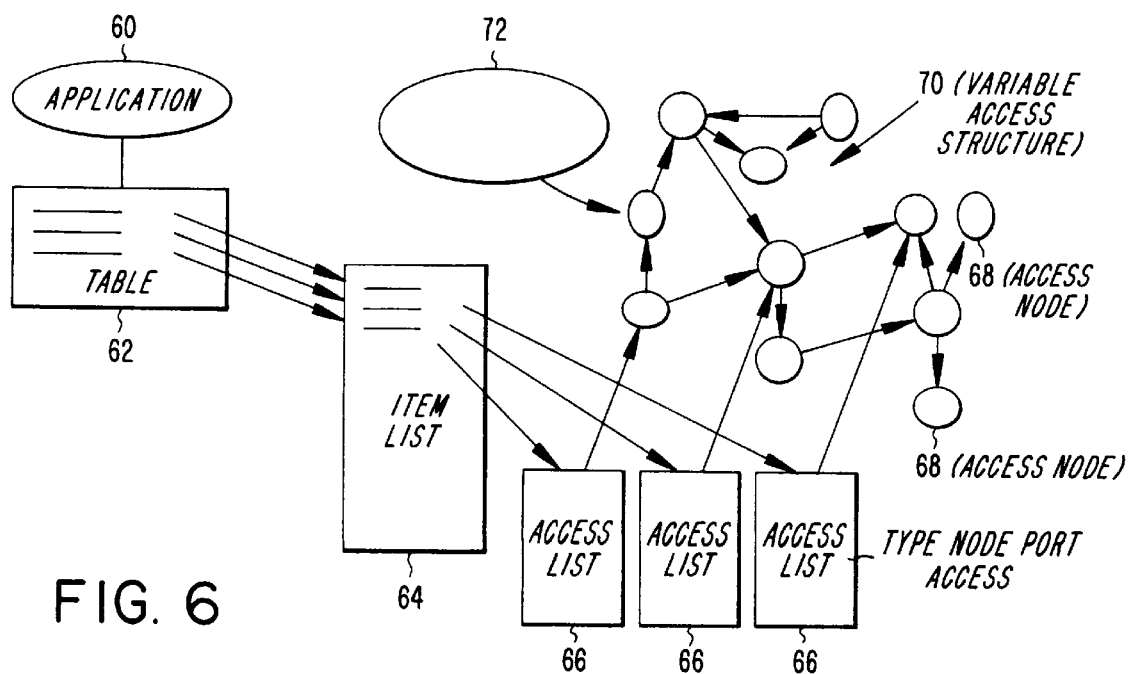
FIG. 6 illustrates retrieval and association of data according to one embodiment of the invention.

FIG. 6 illustrates one embodiment of how views of data are obtained and data is retrieved and associated via a system of control files when running an application. In an application 60 is composed a table 62 with a specification of searched data comprising the name and the type of selected data objects or data items. In an item list 64, a reference to an access list 66 is found depending on each specified data item. In the access list 66, there is information describing where the sought after access node 68 is located in the variable access structure 70, said information for example comprising indications of data type, node, port in a network and access parameters.

The initiation of a view of the access structure or the underlying data objects comprise the steps of:

defining an application view with a specification of requirements such as type of object, data item, method, control program or signals, information sources and functions;

searching in the access node structure for access nodes having references to objects matching an aspect of the specification of requirements;

saving access node identification of matching access nodes in for example a view list;

repeating search until the specification of requirements or other search parameters are satisfied;

if access nodes are missing for stored or connected objects, possibly completing the access node structure by creating new access nodes for said objects.

The references of the variable access structure may be rearranged from time to time, and it may occur that the item list, the access list or the view list do not have up to date information about the location of certain access nodes. For this case, an access structure navigator is provided, by means of which the access structure may be searched and the new position of an access node be identified and possibly stored in the access list. The navigator is in general useful for carrying out searches in the access structure according to dynamically specified methods.

Different search parameters may be used, for example every object stored in a data shell has a unique identity, which in some instances is convenient to use as a search parameter. Data may also be searched by first specifying a time value or a time interval for the data item to be found. The data item or data items which has or have a time parameter with the specified time value are read and then communicated to the retrieving user or user application, alternatively the corresponding access node specifications or references are retrieved and possibly saved.

Figure 9:
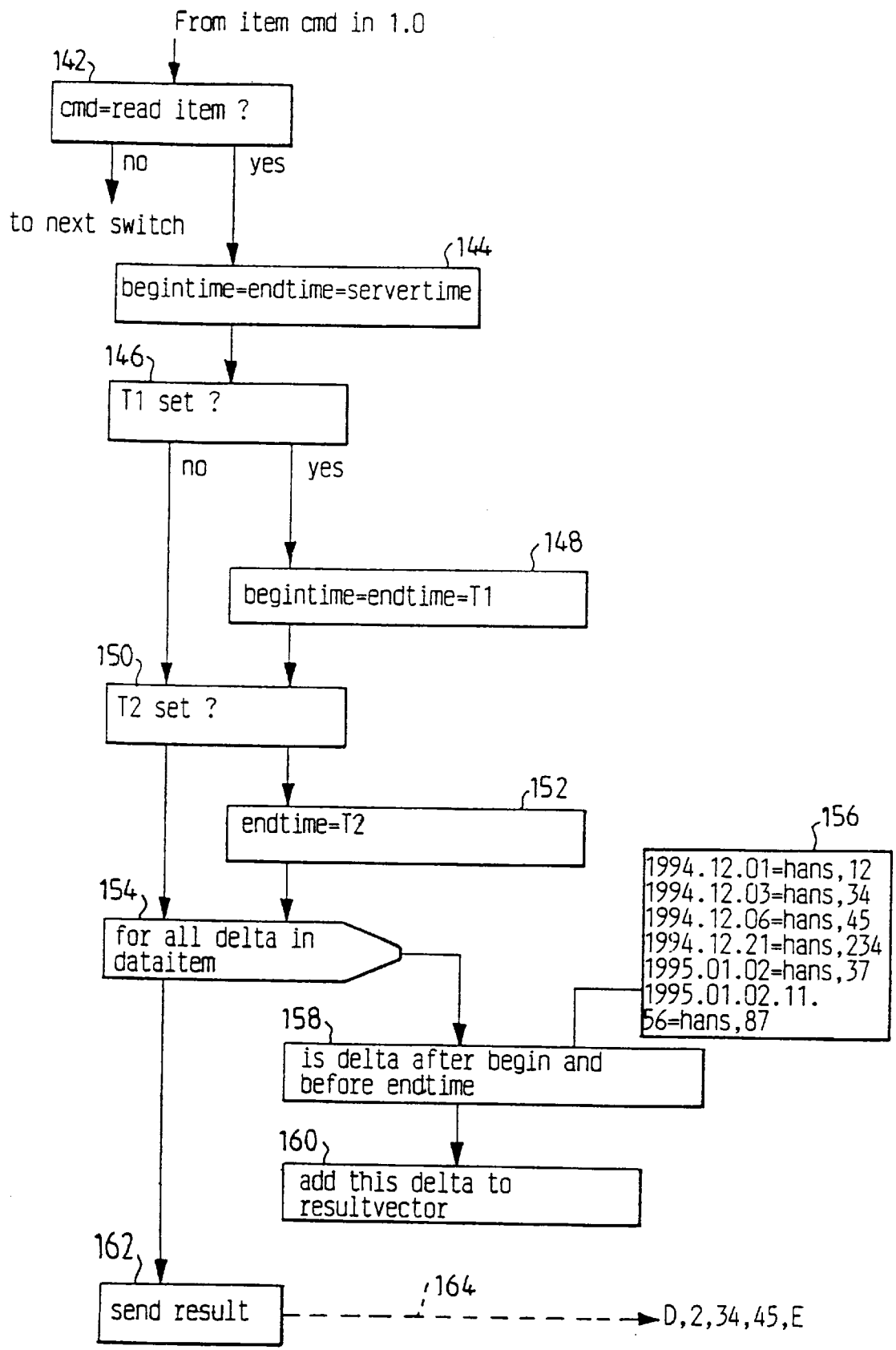
FIG. 9 shows a flowchart for retrieving information according to one embodiment of the invention.

In FIG. 9 is shown a flowchart of a retrieving method comprised in an embodiment of the invention. If a reading command is received in step 142, then time variables are set in accordance with specifications given in the reading command. First the time variables Begintime and Endtime are set in step 144 to the time of a clock in the data processing unit or a server. In step 146 it is checked if the user has specified a first time value T1, and if so, Begintime and Endtime are set to this value T1 in step 148. Then, in step 150, it is checked if a second time value T2 has been specified, and if so, Endtime is set to T2 in step 152. Thereafter, in steps 154, 158 and 160 a data item 156 in the data shell is read and if it has the specified time value equal to server time or T1 or within the interval T1 to T2, this data item is inserted in a result list or result vector. Then, the result list is sent to the user in step 162 by call 164.

In general, navigation may be conducted interactively or in a more batch oriented manner depending on a preset specification of requirements. Common for method is that navigation in accordance with the invention may comprise the steps of:

setting the navigating means for matching access node information with a specification of requirements for a certain view of objects;

calling a first access node giving user identity and view specification, whereupon the access node returns a subview of references to access nodes or objects that are relevant for the specified view;

calling second access nodes in for example a hierarchical manner, for example until a number of subviews coincide for a set of access nodes or objects;

possibly saving a navigation logging in order to speedy obtain the same view at another occasion.

By means of the access control parameters and the navigating means it is possible to preset different views for different users, user groups or interested parties. One embodiment comprises an updating subscription means, by means of which a user may subscribe on automatically generated messages for every updating of information or event related to an object or object attribute. Such a message may also include updated information or data items per se. The method for achieving this feature comprise the steps of:

associating or adding to the control file of an access node a sequnce of steps to be performed in response to a detected event related to an object referred to by the access node;

sending a message possibly including changed data to a subscribing user application; and/or activating an apparatus in response to said detected event.

7. Arrangement

Figure 10:
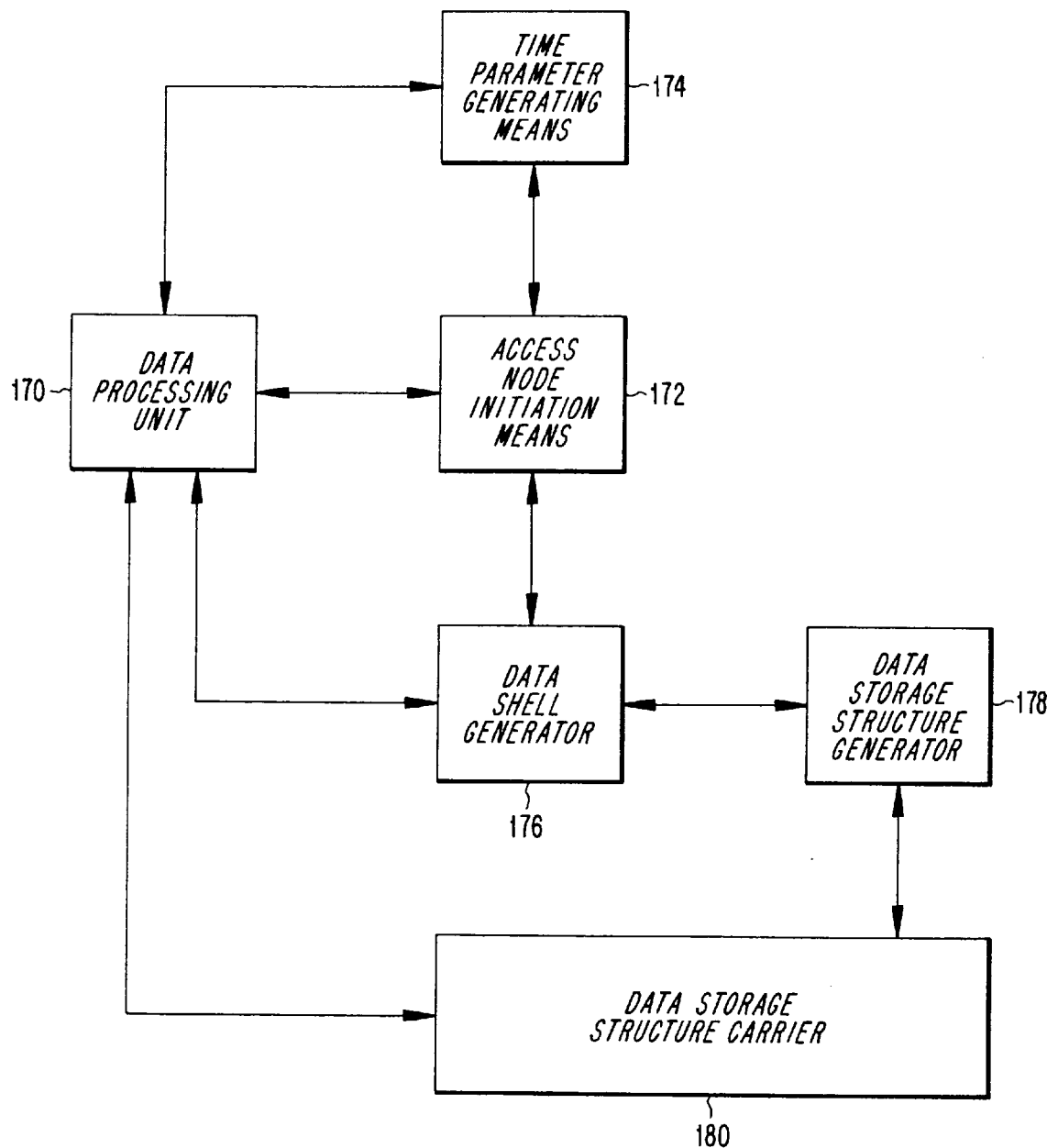
FIG. 10 shows an embodiment of an apparatus for performing the inventive method.

One embodiment of an arrangement for executing the inventive access structure is shown in FIG. 10. A data processing unit 170 comprises a computer processor, a storage device, a data control program being executable by means of the data processing unit 170 and a communications interface. An access node initiation means 172 for initiating and structuring access nodes is communicatably coupled to the data processing unit 170 and to a time parameter generating means 174 for providing data item or references to data items with a time parameter, whereby the time parameter generating means 174 also is communicatably coupled to the data processing unit 170. A data shell generator 176 is communicatably coupled to the data structuring means 172, to the data processing unit 170 and to a data storage structure generator 178, which also is coupled to a data storage structure carrier 180. Said carrier 180 is also communicatably coupled to the data processing unit. The communication links between the units may be realized by conductors or by operative interconnections for data or parameter exchange, i.e. the units are operatively interconnected.

A computer program product, for use with a data processing and storage system, for providing an access structure in accordance with the invention, comprises a storage medium and means for initiating and maintaining an access structure, means for accessing the access structure and other means for carrying out the steps of the inventive method. The above described embodiments of the invention are merely non-limiting examples of the invention, and other designs are possible within the scope of the claims.

What is claimed is:

1. A computer implemented method, for use in a computer-based data processing and storage system, for controlling access to data items, comprising the steps of:

storing a reference to a data item or to a group of data items in a data access node;

storing a reference to another access node thus arranging an access structure of data access nodes, wherein a first access node is directly or indirectly linked to a second access node or a data item referred to by the reference of said second access node;

providing each data item with a time parameter, wherein the time parameter is associated with or stored in connection with said data item; and maintaining access control parameters for each access node, the access control parameters defining access conditions to said access node or said references of said access node.

2. The method as recited in claim 1, wherein said time parameter is the time at which said data is read, said data item is stored or any other indicated time.

3. The method as recited in claim 1, comprising the further step of updating variable data by creating a new data item in which the last data version is stored and by adding said new data item to a relevant group of related data items, whereby data items may be added at any rate enabled by the data processing system processing said data.

4. The method as recited in claim 1, comprising the further step of associating data items upon retrieving, by means of a control structure comprising an application dependent specification and an access specification, by means of which communication with an access node is performed.

5. The method as recited in claim 1, comprising the further step of controlling read and write operations and access to a data item or to an access node by means of access control parameters provided in the access node.

6. The method as recited in claim 1, wherein the initiation of an access structure comprises the steps of:

initiating an instance of an access node data structure;

assigning said access node a node description and an identity code;

establishing references to other, already initiated access nodes according to a selectable initial configuration;

possibly establishing a reference to a data item or to a group of data items;

establishing access parameters, for each access node, for controlling access to information that is accessed via said access node; and possibly repeating the aforementioned steps.

7. The method as recited in claim 1, wherein an access node is realized by means of an active process, the initiation then including starting a process thereby controlling all communication with the access node.

8. The method as recited in claim 1, comprising the further step of adapting a data item referred to by an access node to represent the condition of an apparatus, whereby an output signal from said apparatus is detected and temporarily stored in said data item, and whereby said output signal is made available via said access node.

9. The method as recited in claim 1, comprising the further step of controlling access to an apparatus, wherein an access node contains a reference, possibly via a data item, to a signal terminal of said apparatus at which an output signal from the apparatus is available or an input signal is inputtable.

10. The method as recited in claim 1, comprising the further step of controlling an apparatus by creating apparatus control data, by storing temporarily said control data in a data item referred to by an access node, and by transferring the contents of said control data item to an control signal input terminal of said apparatus.

11. The method as recited in claim 7, comprising the further steps of:

storing a reference list in a first access node;

bringing the access node process into a waiting condition, wherein said access node process is waiting for a user call;

if a user calls the access node, then, by means of said access node process, starting a subprocess realizing a copy of the first access node, having characteristics inherited from the first access node process, for controlling access operations on the reference list and/or on a data item referred to by said first access node;

then again bringing the data shell process into a waiting condition, waiting for further user calls.

12. The method as recited in claim 7, comprising the further steps of:

by means of said subprocess:

checking that the identity and/or the address of the user computer unit is listed in a control file, and if said user computer is not listed then terminating the said subprocess; else checking that the identity of the user is listed in an access right catalogue, and possibly checking a personal identity code and/or polling an access key, and if said user is not listed then terminating the subprocess; else allowing said user to communicate with said access node process; and controlling said access to and communication of data and references contained in the access node by means of an access control parameters allowing different users different views of the access node and underlying objects.

13. The method as recited in claim 11, comprising the further step of setting a timer controlling the time during which said subprocess is allowed to exist.

14. The method as recited in claim 1, comprising the further steps of:

compiling user specific data item information, describing to which data items a user has access rights;

compiling for each data item, location and access information describing its location in the storage structure and access parameters necessary to retrieve said data item;

selecting data items to be associated; and retrieving, by means of said data item information and said location and access information, the selected data items.

15. The method as recited in claim 1, comprising the further steps of initiating a view of the access structure or underlying objects by:

defining an application view with a specification of requirements for wanted objects;

searching in the access structure for access nodes having references to objects matching an aspect of the specification of requirements;

saving access node identification of access nodes for matching objects; and repeating search until the specifications of requirements or other search parameters are satisfied.

16. The method as recited in claim 1, comprising the further steps of navigating through the access structure by:

setting navigation parameters for matching access node information with a specification of requirements for a selected view of objects;

calling a first access node giving user identity and view specification;

returning from the access node a subset of references to access nodes and/or objects that are relevant for the specified view;

calling second access nodes until a number of subsets of references to access nodes and/or objects coincide; and possibly saving a logging of relevant access nodes.

17. A data processing system for maintaining a data access structure for controlling access to stored data items, said system being provided with a data processing unit comprising a computer processor, a data storage medium, a data control program being executable by means of said data processing unit, and a communications interface, and comprising:

means for initiating and maintaining, in the data processing system, a plurality of data access nodes, each storing references to other access nodes and/or to data items stored on the storage medium, wherein each access node is associated with access control parameters for defining access conditions to said access nodes or to said references of said access nodes;

means for providing each data item with a time parameter, wherein said time parameters are stored in connection with or associated to said data items.

18. The system of claim 17, comprising means for generating or initializing a process or a virtual processing unit for each access node.

19. The system of claim 17, comprising means for generating or initializing links between each access node process or access node processing unit.

20. The system of claim 17, comprising means for associating access nodes or data items of said access structure.

21. The system of claim 17, comprising means for controlling access to access nodes depending on said access parameters.

22. The system of claim 17, comprising means for traversing, searching or navigating through the data access structure, by means of which search for one or more access nodes or data item constituting a selectable view is performable.

23. A computer program product, for use with a data processing and storage system, for maintaining a data access structure for controlling access to stored data items, the computer program product comprising:

a recording medium;

means, recorded on the recording medium, for directing the data processing and storage system to initiate and maintain a plurality of data access nodes, each storing references to other access nodes and/or to data items stored on a storage medium in the data processing and storage system, wherein each access node is associated with access control parameters for defining access conditions to said access nodes or to said references of said access nodes;

means, recorded on the recording medium, for directing the data processing and storage system to provide each data item with a time parameter, wherein said time parameters are stored in connection with or associated to said data items.

24. A computer program product as recited in claim 23, comprising means, recorded on the recording medium, for directing the data processing and storage system to generate or initialize a process or a virtual processing unit for each access node.

25. A computer program product as recited in claim 23, comprising means, recorded on the recording medium, for directing the data processing and storage system to generate or initialize links between each access node process or access node processing unit.

26. A computer program product as recited in claim 23, comprising means, recorded on the recording medium, for directing the data processing and storage system to associate access nodes or data items of said access structure.

27. A computer program product as recited in claim 23, comprising means, recorded on the recording medium, for directing the data processing and storage system to control access to access nodes depending on or responsive to said access parameters.

28. A computer program product as recited in claim 23, comprising means, recorded on the recording medium, for directing the data processing and storage system to traverse, search or navigate through the data access structure, by means of which search for one or more access nodes or data items constituting a selectable view is performable.

29. A computer program product, comprising means, recorded on the recording medium, for directing the data processing and storage system to perform the steps as recited in claim 1.

30. A computer program product as recited in claim 29, wherein said time parameter is the time at which said data is read, said data item is stored or any other indicated time.

31. A computer program product as recited in claim 29, further comprising means, recorded on the recording medium, for directing the data processing and storage system to perform the further step of updating variable data by creating a new data item in which the last data version is stored and by adding said new data item to a relevant group of related data items, whereby data items may be added at any rate enabled by the data processing system processing said data.

32. A computer program product as recited in claim 29, further comprising means, recorded on the recording medium, for directing the data processing and storage system to perform the further step of associating data items upon retrieving, by means of a control structure comprising an application dependent specification and an access specification, by means of which communication with an access node is performed.

33. A computer program product as recited in claim 29, further comprising means, recorded on the recording medium, for directing the data processing and storage system to perform the further step of controlling read and write operations and access to a data item or to an access node by means of access control parameters provided in the access node.

34. A computer program product as recited in claim 29, further comprising means, recorded on the recording medium, for directing the data processing and storage system to initiate an access structure by performing the steps of:

initiating an instance of an access node data structure;

assigning said access node a node description and an identity code;

establishing references to other, already initiated access nodes according to a selectable initial configuration;

possibly establishing a reference to a data item or to a group of data items;

establishing access parameters, for each access node, for controlling access to information that is accessed via said access node; and possibly repeating the aforementioned steps.

35. A computer program product as recited in claim 29, further comprising means, recorded on the recording medium, for directing the data processing and storage system to realize an access node by means of an active process, the initiation then including starting a process thereby controlling all communication with the access node.

36. A computer program product as recited in claim 29, further comprising means, recorded on the recording medium, for directing the data processing and storage system to perform the further step of adapting a data item referred to by an access node to represent the condition of an apparatus, whereby an output signal from said apparatus is detected and temporarily stored in said data item, and whereby said output signal is made available via said access node.

37. A computer program product as recited in claim 29, further comprising means, recorded on the recording medium, for directing the data processing and storage system to perform the further step of controlling access to an apparatus, wherein an access node contains a reference, possibly via a data item, to a signal terminal of said apparatus at which an output signal from the apparatus is available or an input signal is inputtable.

38. A computer program product as recited in claim 29, further comprising means, recorded on the recording medium, for directing the data processing and storage system to perform the further step of controlling an apparatus by creating apparatus control data, by storing temporarily said control data in a data item referred to by an access node, and by transferring the contents of said control data item to an control signal input terminal of said apparatus.

39. A computer program product as recited in claim 35, further comprising means, recorded on the recording medium, for directing the data processing and storage system to perform the further steps of:

storing a reference list in a first access node;

bringing the access node process into a waiting condition, wherein said access node process is waiting for a user call;

if a user calls the access node, then, by means of said access node process, starting a subprocess realizing a copy of the first access node, having characteristics inherited from the first access node process, for controlling access operations on the reference list and/or on a data item referred to by said first access node;

then again bringing the data shell process into a waiting condition, waiting for further user calls.

40. A computer program product as recited in claim 35, further comprising means, recorded on the recording medium, for directing the data processing and storage system to perform the further steps of:

by means of said subprocess:

checking that the identity and/or the address of the user computer unit is listed in a control file, and if said user computer is not listed then terminating the said subprocess; else checking that the identity of the user is listed in an access right catalogue, and possibly checking a personal identity code and/or polling an access key, and if said user is not listed then terminating the subprocess; else allowing said user to communicate with said access node process; and controlling said access to and communication of data and references contained in the access node by means of an access control parameters allowing different users different views of the access node and underlying objects.

41. A computer program product as recited in claim 39, further comprising means, recorded on the recording medium, for directing the data processing and storage system to perform the further step of setting a timer controlling the time during which said subprocess is allowed to exist.

42. A computer program product as recited in claim 29, further comprising means, recorded on the recording medium, for directing the data processing and storage system to perform the further steps of:

compiling user specific data item information, describing to which data items a user has access rights;

compiling for each data item, location and access information describing its location in the storage structure and access parameters necessary to retrieve said data item;

selecting data items to be associated; and retrieving, by means of said data item information and said location and access information, the selected data items.

43. A computer program product as recited in claim 29, further comprising means, recorded on the recording medium, for directing the data processing and storage system to perform the further steps of initiating a view of the access structure or underlying objects by:

defining an application view with a specification of requirements for wanted objects;

searching in the access structure for access nodes having references to objects matching an aspect of the specification of requirements;

saving access node identification of access nodes for matching objects; and repeating search until the specifications of requirements or other search parameters are satisfied.

44. A computer program product as recited in claim 29, further comprising means, recorded on the recording medium, for directing the data processing and storage system to perform the further steps of navigating through the access structure by:

setting navigation parameters for matching access node information with a specification of requirements for a selected view of objects;

calling a first access node giving user identity and view specification;

returning from the access node a subset of references to access nodes and/or objects that are relevant for the specified view;

calling second access nodes until a number of subsets of references to access nodes and/or objects coincide; and possibly saving a logging of relevant access nodes.

45. A computer implemented method, for use in a computer-based data processing and storage system, for controlling access to data items, comprising the steps of:

storing a reference to a data item or to a group of data items in a data access node;

storing a reference to another access node thus arranging an access structure of data access nodes, wherein a first access node is directly or indirectly linked to a second access node or a data item referred to by the reference of said second access node;

structuring and/or storing data in separate and unassociated data items, wherein each data item carries only the amount of information that is relevant for its purpose; and providing each data item with a time parameter, wherein the time parameter is associated with or stored in connection with said data item and wherein said time parameter is the time at which said data item is read, said data item is stored or any other indicated time.

46. The method as recited in claim 45, comprising the further step of maintaining access control parameters for each access node, the access control parameters defining access conditions to said access node or said references of said access node.

47. The method as recited in claim 45, comprising the further step of updating variable data by creating a new data item in which the last data version is stored and by adding said new data item to a relevant group of related data items, whereby data items may be added at any rate enabled by the data processing system processing said data.

48. The method as recited in claim 45, comprising the further step of associating data items upon retrieving, by means of a control structure comprising an application dependent specification and an access specification, by means of which communication with an access node is performed.

49. The method as recited in claim 45, comprising the further step of controlling read and write operations and access to a data item or to an access node by means of access control parameters provided in the access node.

50. The method as recited in claim 45, wherein the initiation of an access structure comprises the steps of:

initiating an instance of an access node data structure;

assigning said access node a node description and an identity code;

establishing references to other, already initiated access nodes according to a selectable initial configuration;

possibly establishing a reference to a data item or to a group of data items;

establishing access parameters, for each access node, for controlling access to information that is accessed via said access node; and possibly repeating the aforementioned steps.

51. The method as recited in claim 45, wherein an access node is realized by means of an active process, the initiation then including starting a process thereby controlling all communication with the access node.

52. The method as recited in claim 45, comprising the further step of adapting a data item referred to by an access node to represent the condition of an apparatus, whereby an output signal from said apparatus is detected and temporarily stored in said data item, and whereby said output signal is made available via said access node.

53. The method as recited in claim 45, comprising the further step of controlling access to an apparatus, wherein an access node contains a reference, possibly via a data item, to a signal terminal of said apparatus at which an output signal from the apparatus is available or an input signal is inputtable.

54. The method as recited in claim 45, comprising the further step of controlling an apparatus by creating apparatus control data, by storing temporarily said control data in a data item referred to by an access node, and by transferring the contents of said control data item to an control signal input terminal of said apparatus.

55. The method as recited in claim 51, comprising the further steps of:

storing a reference list in a first access node;

bringing the access node process into a waiting condition, wherein said access node process is waiting for a user call;

if a user calls the access node, then, by means of said access node process, starting a subprocess realizing a copy of the first access node, having characteristics inherited from the first access node process, for controlling access operations on the reference list and/or on a data item referred to by said first access node;

then again bringing the access node process into a waiting condition, waiting for further user calls.

56. The method as recited in claim 51, comprising the further steps of:

by means of said subprocess:

checking that the identity and/or the address of the user computer unit is listed in a control file, and if said user computer is not listed then terminating the said subprocess; else checking that the identity of the user is listed in an access rights catalogue, and possibly checking a personal identity code and/or polling an access key, and if said user is not listed then terminating the subprocess; else allowing said user to communicate with said access node process; and controlling said access to and communication of data and references contained in the access node by means of an access control parameters allowing different users different views of the access node and underlying objects.

57. The method as recited in claim 51, comprising the further step of setting a timer controlling the time during which said subprocess is allowed to exist.

58. The method as recited in claim 45, comprising the further steps of:

compiling user specific data item information, describing to which data items a user has access rights;

compiling for each data item, location and access information describing its location in the storage structure and access parameters necessary to retrieve said data item;

selecting data items to be associated; and retrieving, by means of said data item information and said location and access information, the selected data items.

59. The method as recited in claim 45, comprising the further steps of initiating a view of the access structure or underlying objects by:

defining an application view with a specification of requirements for wanted objects;

searching in the access structure for access nodes having references to objects matching an aspect of the specification of requirements;

saving access node identification of access nodes for matching objects; and repeating search until the specifications of requirements or other search parameters are satisfied.

60. The method as recited in claim 45, comprising the further steps of navigating through the access structure by:

setting navigation parameters for matching access node information with a specification of requirements for a selected view of objects;

calling a first access node giving user identity and view specification;

returning from the access node a subset of references to access nodes and/or objects that are relevant for the specified view;

calling second access nodes until a number of subsets of references to access nodes and/or objects coincide; and possibly saving a logging of relevant access nodes.

61. A data processing system for maintaining a data access structure for controlling access to stored data items, said system being provided with a data processing unit comprising a computer processor, a data storage medium, a data control program being executable by means of said data processing unit, and communications interface, and comprising:

means for initiating and maintaining, in the data processing system, a plurality of data access nodes, each storing references to other access nodes and/or to data items stored on the storage medium;

means for structuring and/or storing data in separate and unassociated data items, wherein each data item carries only the amount of information that is relevant for its purpose; and means for providing each data item with a time parameter, wherein said time parameters are stored in connection with or associated to said data items.

62. The system of claim 61, comprising means for associating each access node with access control parameters for defining access conditions to said access nodes or to said references of said access nodes.

63. The system of claim 61, comprising means for generating or initializing a process or a virtual processing unit for each access node.

64. The system of claim 61, comprising means for generating or initializing links between each access node process or access node processing unit.

65. The system of claim 61, comprising means for associating access nodes or data items of said access structure.

66. The system of claim 62, comprising means for controlling access to access nodes depending on said access parameters.

67. The system of claim 61, comprising means for navigating through the data access structure and searching for one or more access nodes or data items constituting a selectable view.

68. A computer program product, for use with a data processing and storage system, for maintaining a data access structure for controlling access to stored data items, the computer program product comprising:

a recording medium;

means, recorded on the recording medium, for directing the data processing and storage system to initiate and maintain a plurality of data access nodes, each access node storing references to other access nodes and/or to data items stored on a storage medium in the data processing and storage system;

means, recorded on the recording medium, for directing the data processing and storage system structure and/or store data in separate and unassociated data items, wherein each data item carries only the amount of information that is relevant for its purpose; and means recorded on the recording medium for directing the data processing and storage system to provide each data item with a time parameter, wherein said time parameters are stored in connection with or associated to said data items.

69. The computer program product of claim 68, further comprising means, recorded on the recording medium for directing the data processing and storage system to associate each access node with access control parameters for defining access conditions to said access nodes or to said references of said access nodes.

70. A computer program product of claim 68, comprising means, recorded on the recording medium, for directing the data processing and storage system to generate or initialize a process or a virtual processing unit for each access node.

71. The computer program product of any of the claims 68, further comprising means, recorded on the recording medium, for directing the data processing and storage system to generate or initialize links between each access node process or access node processing unit.

72. A computer program product as recited in claim 68, comprising means, recorded on the recording medium, for directing the data processing and storage system to associate access nodes or data items of said access structure.

73. A computer program product as recited in claim 68 comprising means, recorded on the recording medium, for directing the data processing and storage system to control access to access nodes depending on or responsive to said access parameters.

74. A computer program product as recited in claim 68 comprising means, recorded on the recording medium, for directing the data processing and storage system to traverse, search or navigate through the data access structure, by means of which search for one or more access nodes or data items constituting a selectable view is performable.

75. A machine having a memory which contains data representing a data access structure for controlling access to stored data items, the data access structure comprising:

a plurality of data access nodes, each data access node comprising a node description, an identity code and a reference to another, already initiated access node according to a selectable initial configuration and a reference to a data item or to a group of separate and unassociated data items, where each data item carries only the amount of information that is relevant for its purpose, and wherein a time parameter is associated with or stored in connection with each of said data items.

76. The data access structure of claim 75, wherein each access node further comprises an access parameter for controlling access to information that is accessed via said access node.

77. The machine of claim 75, wherein an access node is realized by means of an active process, by means of which all communication with the access node is controlled.

78. The machine of claim 75, wherein a data item referred to by an access node represents the condition of an apparatus, wherein an output signal from said apparatus is detected and temporarily stored in said data item, and said output signal is made available via said access node.

79. The machine of claim 75, wherein the access structure controls access to an apparatus and wherein an access node contains a reference, possibly via a data item to a signal terminal of said apparatus at which an output signal from the apparatus is available or an input signal is inputtable.

80. The machine of claim 77, wherein:

a reference list is stored in a first access node;

the access node process is brought into a waiting condition, wherein said access node process is waiting for a user call;

said access node process starts, upon a user call on the access node, a subprocess realizing a copy of the first access node, having characteristics inherited from the first access node process, for controlling access operations on the reference list and/or on a data item referred to by said first access node; and the access node process is brought into a waiting condition, waiting for further user calls.

81. The machine of claim 80, wherein said subprocess:

checks that the identity and/or the address of the user computer unit is listed in a control file, and if said user computer is not listed then terminating the subprocess;

checks that the identity of the user is listed in an access rights catalogue, and possibly to check a personal identity code and/or polling an access key, and if said user is not listed then to terminate the subprocess;

if either of said checks identify the user as listed allows said user to communicate with said access node process; and to control said access to and communication of data and references contained in the access node by means of access control parameters allowing different users different views of the access node and underlying objects.

82. The machine of claim 80, wherein a timer is set for controlling the time during which said subprocess is allowed to exist.

* * * * *